Figure 1:
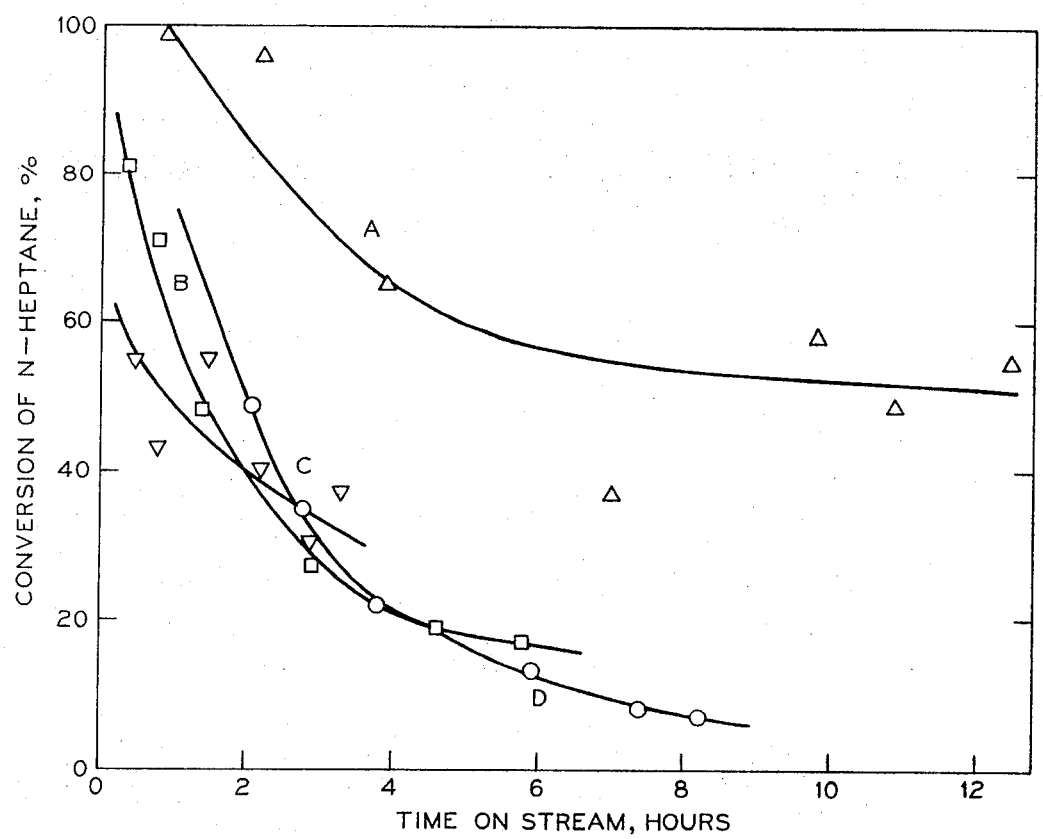
Figure 2:
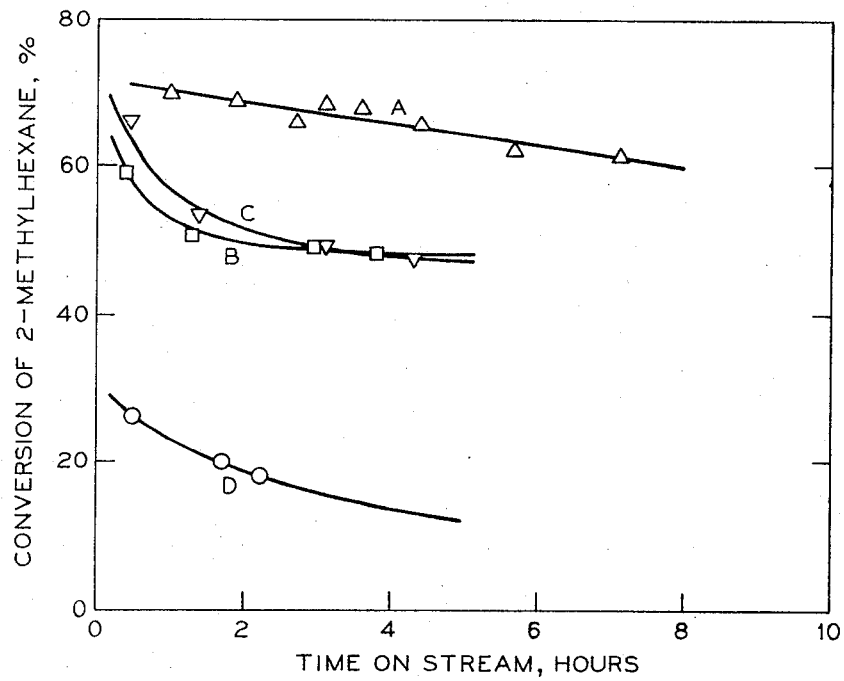

United States Patent [19]

Gardner

[11] 3,864,425
[45] Feb. 4, 1975

[54] RUTHENIUM-PROMOTED FLUORIDED ALUMINA AS A SUPPORT FOR SBF$_5$-HF IN PARAFFIN ISOMERIZATION

[75] Inventor: Lloyd E. Gardner, Bartlesville, Okla.

[73] Assignee: Phillips Petroleum Company, Bartlesville, Okla.

[22] Filed: Sept. 17, 1973

[21] Appl. No.: 398,086

[52] U.S. Cl. .............................. 260/683.68
[51] Int. Cl. ................................. C07c 5/28
[58] Field of Search ............... 260/683.65, 683.68

[56] References Cited
UNITED STATES PATENTS

| | | | |
|---|---|---|---|
| 3,268,439 | 8/1966 | Tupman et al. | 260/683.65 |
| 3,394,202 | 7/1968 | Oelderik | 260/683.68 |
| 3,553,281 | 1/1971 | Goble et al. | 260/683.68 |
| 3,617,516 | 11/1971 | Gooswilligen et al. | 260/683.68 |
| 3,646,152 | 2/1972 | Saggitt et al. | 260/683.68 |

Primary Examiner—C. Davis

[57] ABSTRACT

Paraffin hydrocarbons containing four to eight carbon atoms are isomerized employing SbF$_5$-HF supported on a ruthenium-promoted fluorided alumina.

10 Claims, 2 Drawing Figures

RUTHENIUM-PROMOTED FLUORIDED ALUMINA AS A SUPPORT FOR SBF$_5$-HF IN PARAFFIN ISOMERIZATION

This invention relates to the use of SbF$_5$-HF, that is, to the use of HSbF$_6$ in the skeletal isomerization of paraffins.

In one of its more specific aspects, this invention relates to the use of ruthenium-promoted fluorided alumina as a support for HSbF$_6$ in paraffin hydrocarbon isomerization.

The use of HSbF$_6$ supported on fluorinated alumina for paraffin isomerization is known from such disclosures as that of U.S. Pat. No. 3,394,202, the disclosure of which is included herein by reference.

In accordance with the present invention, the isomerization of C$_4$-C$_8$ paraffins to more highly branched isomers is advantageously practiced in the presence of SbF$_5$-HF supported on ruthenium-promoted fluorided alumina. Data are included to show that fluorided alumina treated with rhodium or palladium failed to show any advantage over fluorided alumina as supports for SbF$_5$-HF. The SbF$_5$-HF catalyst on ruthenium-promoted fluorided alumina gave higher conversion and greater selectivity to multibranched products.

The operability of the present invention employing ruthenium-promoted fluorided alumina is demonstrated by Example I (n-heptane isomerization and 2-methylhexane isomerization). Examples II and III describe the results obtained, respectively, with the palladium and rhodium-treated fluorided aluminas using n-heptane and 2-methylhexane feedstocks. Example IV is a comparative run using fluorided alumina as a support for SbF$_5$-HF in normal heptane and 2-methylhexane isomerizations.

EXAMPLE I

A sample of commercial 0.5 wt. percent ruthenium on alumina (⅛ × ⅛ inch pills) was fluorided in a Monel reactor by heating to 300°F for 2-4 hours in a helium-diluted stream of hydrogen fluoride. This was followed by heating the reactor contents at 800°F for 2-4 hours, respectively, in helium and hydrogen. After the hydrogen purge, the ruthenium-promoted fluorided alumina was cooled to room temperature and stored in a bottle.

A 22.31 g sample of the ruthenium-promoted fluorided alumina was placed in a nickel tube reactor. The reactor contents showed a weight gain of 4.78 g after the sequential treatment of helium-diluted SbF$_5$ and helium-diluted hydrogen fluoride. The catalyst composite contained 17.7 weight percent total of SbF$_5$ and HF based on the total weight of the supported composition.

A normal heptane isomerization run and a 2-methylhexane isomerization run were carried out individually over the above supported catalyst at 23°-24°C, 1.0 atmosphere, 15 mols H$_2$/mol n-C$_7$ (or 2-methylhexane) and a gaseous space velocity of 200 V/V/Hr.

One feedstock contained 84 mol percent n-heptane and 16 mol percent methylcyclohexane; the other feedstock contained 84 mol percent 2-methylhexane and 16 mol percent methylcyclohexane. Chromatographic analysis of vapor samples at various time intervals demonstrated that normal heptane and 2-methylhexane were isomerized to more highly branched C$_7$ isomers. The results are shown in Table I for the normal heptane run and in Table II for the 2-methylhexane run.

TABLE I n-Heptane Isomerization over SbF$_5$-HF Supported on Ruthenium Promoted Fluorided Alumina

| Sample No. | Time on Stream (Hrs.) | % Conversion n-C$_7$ | % Composition (Reactor Effluent)[a] | | | | | | | | | |
|---|---|---|---|---|---|---|---|---|---|---|---|---|
| | | | C$_2$ & C$_3$ | i-C$_4$ | i-C$_5$ | C$_6$'S | 2,2-DMP & 2,4-DMP | 2,2,3-TMB | 3,3-DMP & 2-MH | 2,3-DMP & 3-MH | 3-EP & DMCP | n-C$_7$ |
| 1 | 0.9 | 99.3 | 9.5 | 75.1 | 5.6 | 7.1 | 0.0 | 0.0 | 0.0 | 0.8 | 0.0 | 0.7 |
| 2 | 2.1 | 96.5 | 0.0 | 55.4 | 27.6 | 7.8 | 1.8 | 0.9 | 0.9 | 1.2 | 0.9 | 3.5 |
| 3 | 3.9 | 64.9 | 0.0 | 22.9 | 6.0 | 2.7 | 10.4 | 3.1 | 10.5 | 9.3 | 0.0 | 35.1 |
| 4 | 7.0 | 37.0 | 0.0 | 7.2 | 1.5 | 0.8 | 8.7 | 2.1 | 9.2 | 7.5 | 0.0 | 63.0 |
| 5 | 9.8 | 57.9 | 0.0 | 8.6 | 3.5 | 2.3 | 13.5 | 4.8 | 14.2 | 11.0 | 0.0 | 42.1 |
| 6 | 10.9 | 49.1 | 0.0 | 10.5 | 2.3 | 1.0 | 11.0 | 3.0 | 11.7 | 9.6 | 0.0 | 50.9 |
| 7 | 12.6 | 54.9 | 0.0 | 23.3 | 3.4 | 1.1 | 9.9 | 2.7 | 7.9 | 6.6 | 0.0 | 45.1 |

[a] Excluding methylcyclohexane; 2,2-DMP; 2,4-DMP; 2,2,3-TMB; 3,3-DMP; 2-MH; 2,3-DMP; 3-MH; 3-EP; and DMCP, represent, respectively, 2,2-dimethylpentane; 2,4-dimethylpentane; 2,2,3-trimethylbutane; 3,3-dimethylpentane; 2-methylhexane; 2,3-dimethylpentane; 3-methylhexane; 3-ethylpentane, and dimethylcyclopentane.

TABLE II

2-Methylhexane Isomerization over SbF$_5$-HF Supported on Ruthenium Promoted Fluorided Alumina

| Sample No. | Time on Stream (Hrs.) | % Conversion No. 2-MH | % Composition (Reactor Effluent)[a] | | | | | | | | |
|---|---|---|---|---|---|---|---|---|---|---|---|
| | | | i-C$_4$ | i-C$_5$ | C$_6$'s | 2,2-DMP & 2,4-DMP | 2,2,3-TMB | 3,3-DMP & 2-MH | 2,3-DMP & 3-MH | 3-EP & DMCP | n-C$_7$ |
| 1 | 1.0 | 71.3 | 3.0 | 0.7 | 0.6 | 27.0 | 2.3 | 29.7 | 24.1 | 0.6 | 12.0 |
| 2 | 1.9 | 69.0 | 2.9 | 0.9 | 0.4 | 27.2 | 2.0 | 31.0 | 27.2 | 0.6 | 7.8 |
| 3 | 2.7 | 65.8 | 2.5 | 0.6 | 0.5 | 25.0 | 1.3 | 34.2 | 27.9 | 0.9 | 7.1 |
| 4 | 3.1 | 69.4 | 2.5 | 0.6 | 1.2 | 25.8 | 1.6 | 30.6 | 25.7 | 0.7 | 11.3 |
| 5 | 3.6 | 67.8 | 2.8 | 0.8 | 1.0 | 29.8 | 2.1 | 32.2 | 26.3 | 0.9 | 4.1 |
| 6 | 4.4 | 65.9 | 2.6 | 0.6 | 0.4 | 29.2 | 1.6 | 34.1 | 28.0 | 0.9 | 2.6 |
| 7 | 5.7 | 62.3 | 2.6 | 0.8 | 0.4 | 26.0 | 1.3 | 37.7 | 28.7 | 0.9 | 1.6 |
| 8 | 7.1 | 60.6 | 1.9 | 0.4 | 0.3 | 25.3 | 1.1 | 39.4 | 29.5 | 0.8 | 1.3 |

No. Based on 100 − (3,3-DMP & 2-MH) values
[a] See footnote a of Table I

EXAMPLE II

A sample of commercial 0.5 wt. percent palladium on alumina (⅛ × ⅛ inch pills) was fluorided as described in Example I.

A 23.56 g sample of the palladium-fluorided alumina was placed in a nickel tube reactor. The reactor contents showed a weight gain of 6.30 g after the sequential treatment of helium-diluted SbF₅ and helium-diluted hydrogen fluoride. The catalyst composite contained 21.1 weight percent total of SbF₅ and HF based on the total weight of the supported composition. Individual isomerizations of $n$-heptane and 2-methylhexane were carried out over the above supported catalyst at 23–24°C, 1.0 atmosphere, 15 mols H₂/mol $n$-C₇(or 2-methylhexane) and a gaseous space velocity of 200 V/V/Hr. Feedstocks were as in Example I. The normal heptane results are given in Table III. Results for 2-methylhexane are given in Table IV.

with a helium-diluted stream of hydrogen fluoride at 800°F followed by heating at 800°F in a helium purge.

An 11.35 g sample of the above rhodium-fluorided alumina was placed in a nickel tube reactor. The reactor contents showed a weight gain of 1.24 g after the sequential treatment of helium-diluted SbF₅ and helium-diluted hydrogen fluoride. The catalyst composite contained 9.8 weight percent total of SbF₅ and HF based on the total weight of the supported composition.

Isomerization of 2-methylhexane was carried out over the above catalyst and the results are shown in Table V. The feedstock was as in Example I.

After the 2-methylhexane run, the catalyst was treated with SbF₅ and HF to give a catalyst composite containing 18.1 weight percent total of SbF₅ and HF based on the total weight of the supported composition.

Isomerization of $n$-heptane was carried out over the above catalyst and the results are shown in Table VI.

TABLE III n-Heptane Isomerization Over SbF₅-HF on Palladium-Fluorided Alumina Support

| Sample No. | Time on Stream (Hrs.) | % Conversion n-C₇ | i-C₄ | i-C₅ | C₆'s | 2,2-DMP & 2,4-DMP | 2,2,3-TMB | 3,3-DMP & 2-MH | 2,3-DMP & 3-MH | 3-EP & DMCP | n-C₇ |
|---|---|---|---|---|---|---|---|---|---|---|---|
| 1 | 0.5 | 54.6 | 11.8 | 3.3 | 1.6 | 9.9 | 2.8 | 16.2 | 9.0 | 0.0 | 45.4 |
| 2 | 0.8 | 42.9 | 8.7 | 1.7 | 0.8 | 9.2 | 2.4 | 12.1 | 8.0 | 0.0 | 57.1 |
| 3 | 1.5 | 55.4 | 11.2 | 3.1 | 1.5 | 13.4 | 3.9 | 12.6 | 9.7 | 0.0 | 44.6 |
| 4 | 2.2 | 40.4 | 6.7 | 1.3 | 0.6 | 10.3 | 2.2 | 10.8 | 8.5 | 0.0 | 59.6 |
| 5 | 2.9 | 30.0 | 4.1 | 0.8 | 0.2 | 8.0 | 1.4 | 8.8 | 6.7 | 0.0 | 70.0 |
| 6 | 3.3 | 37.1 | 4.1 | 0.8 | 0.8 | 9.5 | 1.6 | 11.7 | 8.6 | 0.0 | 62.9 |

"See footnote a Table I

TABLE IV

2-Methylhexane Isomerization over SbF₅-HF on Palladium-Fluorided Alumina Support

| Sample No. | Time on Stream (Hrs.) | % Conversion No. 2-MH | i-C₄ | i-C₅ | C₆'s | 2,2-DMP & 2,4-DMP | 2,2,3-TMB | 3,3-DMP & 2-MH | 2,3-DMP & 3-MH | 3-EP & DMCP | n-C₇ |
|---|---|---|---|---|---|---|---|---|---|---|---|
| 1 | 0.5 | 65.8 | 0.6 | 0.2 | 0.1 | 14.1 | 0.6 | 34.2 | 19.4 | 0.4 | 30.2 |
| 2 | 1.4 | 53.5 | 0.7 | 0.2 | 0.1 | 16.6 | 0.6 | 46.5 | 27.8 | 0.7 | 6.8 |
| 3 | 3.1 | 49.2 | 0.8 | 0.4 | 0.1 | 15.1 | 0.7 | 50.8 | 27.7 | 0.8 | 3.6 |
| 4 | 4.3 | 47.6 | 0.7 | 0.2 | 0.1 | 13.7 | 0.5 | 52.4 | 28.0 | 0.9 | 3.5 |

No. Based on 100 – (3,3-DMP & 2-MH) values
"See footnote a Table I

EXAMPLE III

A sample of commercial 0.5 wt. percent rhodium on alumina (⅛ × ⅛ inch pills) was fluorided by treatment The feedstock was as in Example I.

The isomerizations of 2-methylhexane and $n$-heptane were carried out at the same conditions described in Examples I and II.

TABLE V

2-Methylhexane Isomerization Over SbF₅-HF on Rhodium-Fluorided Alumina Support

| Sample No. | Time on Stream (Hrs.) | % Conversion No. 2-MH | i-C₄ | i-C₅ | C₆'s | 2,2-DMP & 2,4-DMP | 2,2,3-TMB | 3,3-DMP & 2-MH | 2,3-DMP & 3-MH | 3-EP | n-C₇ |
|---|---|---|---|---|---|---|---|---|---|---|---|
| 1 | 0.5 | 26.1 | 0.0 | 0.0 | 0.0 | 1.8 | 0.0 | 73.9 | 13.0 | 0.3 | 11.0 |
| 2 | 1.7 | 19.8 | 0.0 | 0.0 | 0.0 | 1.1 | 0.0 | 80.2 | 11.9 | 0.1 | 6.7 |
| 3 | 2.2 | 18.5 | 0.0 | 0.0 | 0.0 | 0.6 | 0.0 | 81.5 | 13.0 | 0.0 | 4.9 |

No. Based on 100 – (3,3,-DMP & 2-MH) values
"See footnote a Table I

TABLE VI n-Heptane Isomerization Over SbF₅-HF on Rhodium-Fluorided Alumina Support

| Sample No. | Time on Stream (Hrs.) | % Conversion n-C₇ | i-C₄ | C₅ | C₆ | 2,2-DMP & 2,4-DMP | 2,2,3-TMP | 3,3-DMP & 2-MH | 2,3-DMP & 3-MH | 3-EP & DMCP | n-C₇ |
|---|---|---|---|---|---|---|---|---|---|---|---|
| 1 | 2.1 | 49.4 | 14.0 | 2.0 | 1.1 | 9.6 | 2.5 | 10.7 | 9.2 | 0.3 | 50.6 |
| 2 | 2.8 | 34.7 | 6.1 | 0.9 | 0.6 | 8.2 | 1.4 | 9.6 | 7.9 | 0.0 | 65.3 |
| 3 | 3.8 | 22.5 | 3.2 | 0.5 | 0.1 | 5.6 | 1.0 | 6.3 | 5.8 | 0.0 | 77.5 |
| 4 | 5.9 | 12.8 | 1.3 | 0.1 | 0.0 | 3.2 | 0.5 | 4.0 | 3.5 | 0.0 | 87.2 |
| 5 | 7.4 | 8.4 | 0.8 | 0.1 | 0.0 | 1.7 | 0.2 | 3.1 | 2.3 | 0.0 | 91.6 |
| 6 | 8.2 | 7.0 | 0.7 | 0.1 | 0.0 | 2.0 | 0.2 | 2.4 | 1.6 | 0.0 | 93.0 |

*See footnote a Table I*

EXAMPLE IV

An 11.68 g sample of fluorided alumina was placed in a nickel tube reactor. The reactor contents showed a weight gain of 1.10 g after the sequential treatment of helium-diluted SbF₅ and helium-diluted hydrogen fluoride. The catalyst composite contained 8.6 wt. percent total of SbF₅ and HF based on the total weight of the supported composition.

Individual normal heptane and 2-methylhexane isomerization runs were carried out over the above catalyst at the same conditions as feedstocks as used in Examples I, II and III. The results of the normal heptane runs are shown in Table VII and the results of the 2-methylhexane runs are shown in Table VIII.

The results of the aforementioned runs are shown on the attached drawings in which FIGS. I and II represent graphically the results of the foregoing runs.

Referring now to these figures, FIG. I represents the results of n-heptane isomerization runs, as follows:

| Curve | Description | Example |
|---|---|---|
| A | Ruthenium-fluorided alumina | I |
| B | Fluorided alumina | IV |
| C | Palladium-fluorided alumina | II |
| D | Rhodium-fluorided alumina | III |

FIG. II represents the results of the 2-methylhexane isomerization runs, as follows:

| Curve | Description | Example |
|---|---|---|
| A | Ruthenium-fluorided alumina | I |
| B | Fluorided alumina | IV |
| C | Palladium-fluorided alumina | II |
| D | Rhodium-fluorided alumina | III |

TABLE VII n-Heptane Isomerization over SbF₅-HF Supported on Fluorided Alumina

| Sample No. | Time on Stream (Hrs.) | % Conversion n-C₇ | C₃ | i-C₄ | i-C₅ | C₆'s | 2,2-DMP & 2,4-DMP | 2,2,3-TMB | 3,3-DMP & 2-MH | 2,3-DMP & 3-MH | 3-EP | n-C₇ |
|---|---|---|---|---|---|---|---|---|---|---|---|---|
| 1 | 0.4 | 80.9 | 1.1 | 11.9 | 7.3 | 15.4 | 13.0 | 5.5 | 14.9 | 11.8 | 0.0 | 19.1 |
| 2 | 0.7 | 70.3 | 0.3 | 19.5 | 4.7 | 3.2 | 13.0 | 3.7 | 13.6 | 12.0 | 0.4 | 29.7 |
| 3 | 1.4 | 48.0 | 0.0 | 7.6 | 1.4 | 2.2 | 11.2 | 2.1 | 12.6 | 10.9 | 0.0 | 52.0 |
| 4 | 2.9 | 26.3 | 0.0 | 1.3 | 0.3 | 0.4 | 6.7 | 1.4 | 8.4 | 7.6 | 0.2 | 73.7 |
| 5 | 4.6 | 18.7 | 0.0 | 0.9 | 0.1 | 0.8 | 5.2 | 0.5 | 7.5 | 3.7 | 0.0 | 81.3 |
| 6 | 5.8 | 16.3 | 0.0 | 0.5 | 0.1 | 0.7 | 4.4 | 0.3 | 4.8 | 5.5 | 0.0 | 83.7 |

*See footnote a Table I*

TABLE VIII

2-Methylhexane Isomerization over SbF₅-HF Supported on Fluorided Alumina

| Sample No. | Time on Stream Hrs. | % Conversion No. 2-MH | i-C₄ | i-C₅ | C₆'s | 2,2-DMP & 2,4-DMP | 2,2,3-TMB | 3,3-DMP & 2-MH | 2,3-DMP & 3-MH | 3-EP | n-C₇ |
|---|---|---|---|---|---|---|---|---|---|---|---|
| 1 | 0.4 | 59.3 | 0.7 | 0.3 | 0.2 | 17.8 | 0.6 | 40.7 | 26.4 | 1.0 | 12.3 |
| 2 | 1.3 | 51.2 | 0.5 | 0.1 | 0.1 | 15.4 | 0.3 | 48.8 | 27.4 | 0.7 | 6.7 |
| 3 | 3.0 | 49.0 | 0.3 | 0.2 | 0.2 | 14.4 | 0.2 | 51.0 | 27.6 | 0.7 | 5.4 |
| 4 | 3.8 | 48.1 | 0.2 | 0.0 | 0.0 | 12.1 | 0.3 | 51.9 | 30.2 | 0.8 | 4.5 |

Summarily, these figures indicate that HSbF₆ supported on ruthenium-promoted fluorided alumina gives the highest conversion of n-heptane and 2-methylhexane to more highly branched isomers.

In view of the foregoing actually-performed runs, the following statements as to the applicability and operability of the invention are made.

The invention is applicable to any paraffin containing 4 to 8 carbon atoms, employing $HSbF_6$ supported on a ruthenium-promoted fluorided alumina.

The quantity of ruthenium metal deposited on the catalyst can be in the range of from about 0.05 to about 10 weight percent based upon the total weight of the supported composition. Preferably the quantity of ruthenium will be within the range of from about 0.1 to about 2 weight percent on the aforesaid basis.

EXAMPLE V

The runs were made at 0°C, atmospheric pressure, 15 mols $H_2$/mol n-heptane and the feed contained 16 mol percent methylcyclohexane and 84 mol percent n-heptane. The glc results (excluding n-heptane) in Table IX indicate the greater selectivity to multibranched products in the ruthenium-promoted fluorided alumina system as reflected by the higher values for the "Ratio M/S".

TABLE IX n-Heptane Isomerization Runs with $SbF_5$-HF on Ruthenium Promoted Fluorided Alumina and $SbF_5$-HF on Fluorided Alumina

|  | $SbF_5$-HF on Ru-F-$Al_2O_3$[a] | $SbF_5$-HF on F-$Al_2O_3$[b] |
|---|---|---|
| Run Time, Hrs. | 7.1 | 5.0 |
| Avg. Space Velocity V/V/Hr. | 840 | 700 |
| n-Heptane, % Conversion | 43 | 26 |
| $C_7$ Isomers No./Wt. %[c] | 2,2-DMP/4.9 | 2,2-DMP/1.4 |
|  | 2,4-DMP/27.8 | 2,4-DMP/28.5 |
|  | 2,2,3-TMB/10.3 | 2,2,3-TMB/4.7 |
|  | 3,3-DMP/4.9 | 3,3-DMP/1.0 |
|  | 2-MH/25.5 | 2-MH/34.5 |
|  | 2,3-DMP/10.5 | 2,3-DMP/8.9 |
|  | 3-MH/16.1 | 3-MH/21.0 |
| Total Single Branching (S) | 41.6 | 55.5 |
| Total Multibranching (M) | 58.4 | 44.5 |
| Ratio M/S | 1.40 | 0.80 |

[a]Ruthenium promoted fluorided alumina; 33.1 weight percent total of $SbF_5$ and HF based on the total weight of the supported composition.
[b]Fluorided alumina; 10.3 weight percent total of $SbF_5$ and HF based on the total weight of the supported composition.
[c]Glc analyses of $C_7$ fraction of product (excluding n-$C_7$).
No. Abbreviations are defined in footnote to Table I.

The total quantity of $SbF_5$ and HF, which can be considered as $HSbF_6$, based on the total weight of the supported composition can be within the range of from about 1 to about 50 weight percent and preferably it will be within the range of from about 5 to about 25 weight percent.

The hydrocarbon feed will be introduced into contact with the catalyst with hydrogen, the molar ratio of hydrogen to hydrocarbon feedstock being within the range of from about 0.1 to about 100 and preferably from about 1 to about 20.

The isomerization can be conducted at a temperature within the range of from about −80° to about 100°C. Preferably, it will be conducted at a temperature within the range of from about 0 to about 35°C. The pressure can be within the range of from about 0.1 to about 70 atmospheres. Preferably, the pressure will be within the range of from about 1 to about 5 atmospheres.

The isomerization can be conducted at a gaseous space velocity within the range of from about 5 to about 5,000 volumes of gaseous feed (hydrocarbon plus hydrogen feed) per volume of catalyst per hour and preferably within the range of from about 100 to 1,000 volumes per volume per hour.

The runs described below in Example V were carried out to compare the $SbF_5$-HF catalyst on ruthenium-promoted fluorided alumina with the $SbF_5$-HF catalyst on fluorided alumina in regard to selectivity to multibranched products obtained in a normal heptane isomerization.

It will be evident in view of the foregoing that various modifications can be made to the method of this invention. Such, however, are considered as being within the scope of the invention.

What is claimed is:

1. A method of isomerizing paraffin hydrocarbons containing 4 to 8 carbon atoms contained in a feedstream which comprises passing said feedstream and hydrogen into contact with a composition comprising a ruthenium-promoted fluorided alumina catalyst comprising $SbF_5$-HF to isomerize said hydrocarbons and recovering the isomerized hydrocarbons.

2. The method of claim 1 in which ruthenium is present in an amount within the range of from about 0.05 to about 10 weight percent of said composition.

3. The method of claim 1 in which said $SbF_5$-HF is present in an amount within the range of from about 1 to about 50 percent of said composition.

4. The method of claim 1 in which said feedstream is passed into contact with said catalyst at a temperature within the range of from about −80° to about 100°C.

5. The method of claim 1 in which said feedstream is passed into contact with said catalyst at a pressure within the range of from about 0.1 to about 70 atmospheres.

6. The method of claim 1 in which said feedstream and said hydrogen are passed into contact with said catalyst at a space velocity within the range of from about 5 to about 5,000 volumes per volume of catalyst per hour.

7. The method of claim 1 in which said paraffin hydrocarbon is chosen from n-heptane and 2-methylhexane, said composition contains about 0.5 weight percent ruthenium and about 17.7 weight percent HSbF$_6$ and said feedstream and hydrogen are contacted with said composition at a gaseous space velocity of about 200, a temperature of about 23°C and a pressure of about 1 atmosphere.

8. The method of claim 7 in which said feedstock contains about 84 mol percent n-heptane.

9. The method of claim 1 in which said paraffin hydrocarbon is 2-methylhexane, said composition contains about 0.5 weight percent ruthenium and about 17.7 weight percent HSbF$_6$ and said feedstream and hydrogen are contacted with said composition at a gaseous space velocity of about 200, a temperature of about 23°C and a pressure of about 1 atmosphere.

10. The method of claim 7 in which said feedstock contains about 84 mol percent 2-methylhexane.

* * * * *